UNITED STATES PATENT OFFICE.

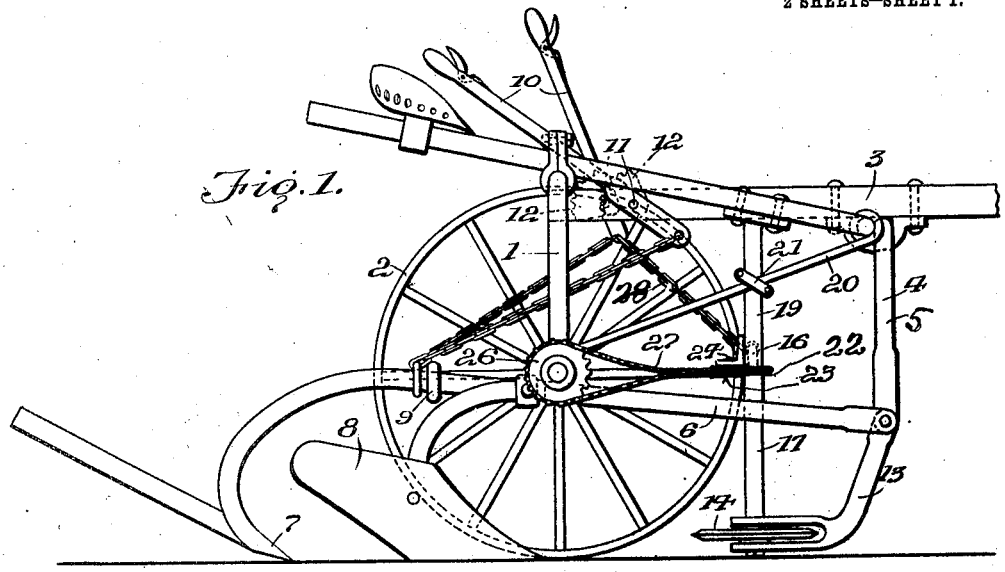

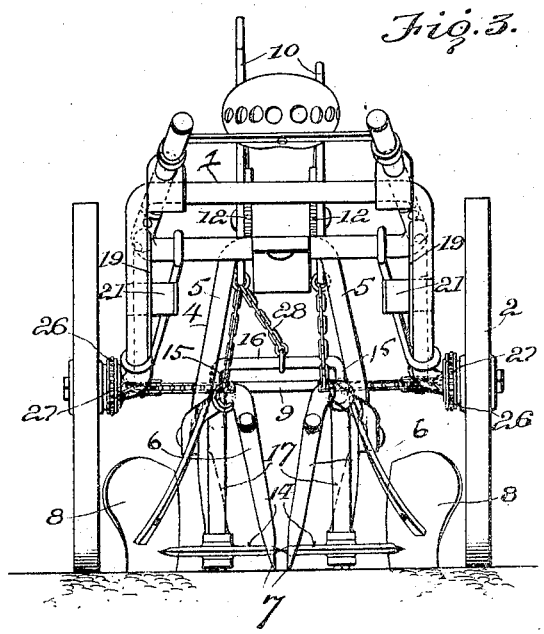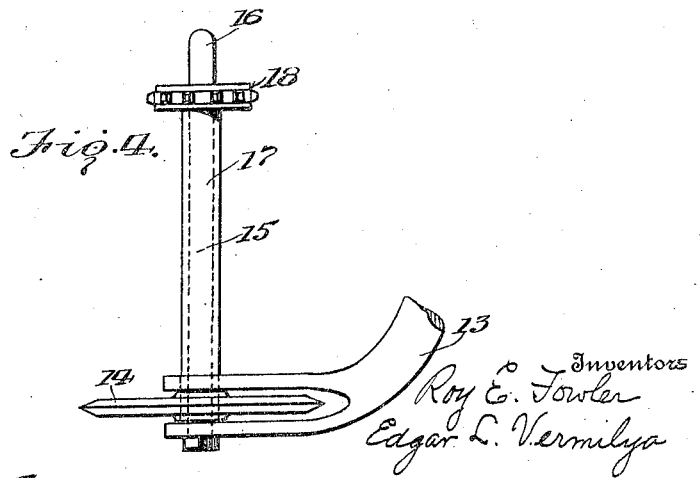

ROY E. FOWLER AND EDGAR L. VERMILYA, OF FREMONT, OHIO.

MACHINE FOR TOPPING AND DIGGING BEETS.

1,091,823.  Specification of Letters Patent.  Patented Mar. 31, 1914.

Application filed June 26, 1913. Serial No. 775,930.

*To all whom it may concern:*

Be it known that we, ROY E. FOWLER and EDGAR L. VERMILYA, citizens of the United States, residing at Fremont, in the county of Sandusky and State of Ohio, have invented certain new and useful Improvements in Machines for Topping and Digging Beets, of which the following is a specification.

This invention relates, in a general way, to cultivators, but more particularly to machines for topping and digging beets, and similar articles, and it consists in the general arrangement, construction and combination of the several parts of the device, as will be hereinafter fully described, and briefly set forth in the claims.

The principal object of the invention is to provide a machine of the simplest construction consistent with efficiency and durability, and to this end we have produced the machine illustrated in the accompanying drawing, in which—

Figure 1 is a side elevation of our improved beet topper and digger, with one of the wheels thereof removed; Fig. 2, a top plan view; Fig. 3, a rear elevation, and Fig. 4 a detail of one of the disk-cutters.

Referring to the several views, the numeral 1 indicates the cultivator frame, 2 the wheels upon which said frame is mounted, and 3 the pole or tongue of the cultivator. At the forward end of the frame 1 is pivotally secured a downwardly extending yoke 4, and to each arm 5 of this yoke is pivotally connected a rearwardly extending bar 6 having its rear end curved downwardly and terminating in a digger 7, as shown. Connected to each of the said bars 6, forward of the digger portion thereof, is a shovel or spreader 8, similar to those of right and left hand plows. The bars 6 are held in a fixed separated position by a suitable cross-bar or rod 9, so secured to said bars 6 that each may be raised or lowered independently of the other, and said bars 6, together with the diggers and shovels or spreaders carried thereby, are raised and lowered by means of levers 10, 10, which are pivoted to the opposite sides of the pole or tongue 3, each lever being connected with the digger-bar 6 beneath it by means of a suitable chain, similar to those used on cultivators. The digger-bars 6, when raised are held in elevated position by means of pins 11, 11, projecting from the levers 10, 10, engaging notches in the periphery of segments 12, 12, secured to the sides of the tongue 3, as shown.

Pivotally secured to the arms 5, of the downwardly extending yoke 4, are rearwardly extending bars 13, 13, which have their outer or rear ends forked, and rotatably mounted in each fork is a cutter-disk 14, on the arms 15, 15, of a yoke 16; each cutter-disk being provided with a suitable hub or sleeve 17, upon which are secured means whereby rotation of said cutter-disks may be accomplished. It will be observed that by reason of the disks being mounted on the arms of the yoke 16, the cutting edges of said disks will, at all times, be held in juxtaposition, and ready for the cutting or topping operation. Each hub or sleeve 17 is provided, preferably, with a suitable sprocket wheel 18 through which rotation is imparted to said cutter-disks. The hub of each wheel 2, of the frame, is provided with a similar sprocket wheel, 26; and is connected with one of the sprocket wheels 18 on the hub or sleeve 17 of a cutter-disk 14, as is evident, by a suitable sprocket chain 27, as is apparent, whereby the cutters 14, 14, are operated from said wheels 2, 2, as is evident. Rigidly secured to each side-bar of the frame 1, is a depending bar 19, suitably braced by being clipped to the brace rod 20, of the frame 1, by means of a clip 21, or by other suitable means. Secured to the lower end of this bar 19 is a suitable grooved idler 22, and 23 is a similar idler mounted on a bracket 24 secured to the bar 19 and extending rearwardly therefrom, as shown. These idlers 22 and 23 are located in the path of the sprocket chain 27, and are designed for the purpose of carrying said chain, and also for the purpose of preventing it running off the sprocket wheels 26 and 18, when the plane of the chain is changed from a horizontal to a vertical one, and vice versa, as will be evident.

It is evident that instead of employing the particular chain and sprocket mechanism herein shown for operating the cutter-disks, a rod and gears may be used, as may also a combined chain and sprocket and train of gears. It is also evident that the cutting edges of the cutter-disks may be either plain, corrugated, or saw-toothed, although they are shown in the drawing as plain. It is also evident that the cutting mechanism may be similar to those used in mowing-machines, and lawn-mowers, if so desired.

The cutting mechanism is raised and lowered by means of one of the levers 10 through the medium of a chain 28, which has one end attached to the lever and the other end attached to the top of the yoke 16. The cutting mechanism, when raised, is held in elevated position by the same means as are the digger-bars 6, as is evident.

Having thus fully described our invention, what we claim is—

1. A machine for topping and digging beets, having in combination a frame, shovel-bars terminating in diggers, means for raising and lowering the shovel-bars, rearwardly extending bars pivoted to the frame and provided with forked ends, a yoke having its arms passing through said forked ends, cutters journaled on said arms and operative between the forks, and means for raising and lowering the cutters.

2. A machine for topping and digging beets, having in combination therewith shovel-bars terminating in diggers, rearwardly extending bars pivoted to the frame and having their rear ends forked, beet topping mechanisms carried by said bars, means connecting said topping mechanisms with the wheels of the machine, whereby said topping mechanism is operated from said wheels, and means for raising and lowering said topping mechanism and said digger-bars, and holding the same in raised position.

In testimony whereof we have affixed our signatures in presence of two witnesses.

ROY E. FOWLER.
EDGAR L. VERMILYA.

Witnesses:
JOHN J. LEHMANN,
FRANK LEHMANN.